United States Patent [19]

Fehring

[11] Patent Number: 5,638,935
[45] Date of Patent: Jun. 17, 1997

[54] CENTRIFUGAL CLUTCH

[76] Inventor: Thomas C. Fehring, 5167 Michael Anthony La., Cincinnati, Ohio 45247

[21] Appl. No.: 548,425

[22] Filed: Oct. 26, 1995

[51] Int. Cl.⁶ .................................................. F16D 43/08
[52] U.S. Cl. .................................. 192/105 B; 192/70.13; 192/110 R
[58] Field of Search ................. 192/105 B, 103 A, 192/110 R, 111 R, 70.13, 70.23, 70.25, 93 A

[56] References Cited

U.S. PATENT DOCUMENTS

| | | | |
|---|---|---|---|
| 1,682,493 | 8/1928 | Ehrenfeld | 192/105 B |
| 1,766,227 | 6/1930 | Russell | 192/105 B |
| 2,203,117 | 6/1940 | Whatmough | 192/105 B |
| 3,767,019 | 10/1973 | Wingler | 192/105 B X |
| 5,070,984 | 12/1991 | Fehring | 192/105 B |

FOREIGN PATENT DOCUMENTS

| | | | |
|---|---|---|---|
| 54-140051 | 10/1979 | Japan | 192/105 B |

*Primary Examiner*—Richard M. Lorence
*Attorney, Agent, or Firm*—Wood, Herron & Evans, L.L.P.

[57] ABSTRACT

A centrifugal clutch comprises a rotating input drive member, a rotatable output driven member, at least one drive plate mounted for rotation with the drive member, at least one clutch disc mounted for rotation with the driven member and being disposed adjacent the drive plate, a pressure plate mounted for rotation with the drive member and including at least one pair of seats, at least one pair of weighted balls disposed in the pair of seats in the pressure plate, and at least one pair of springs attached to the pressure plate. Each spring of the pair of springs contacts and retains one ball of the pair of balls seated in a respective pressure plate seat. The springs resist outward radial movement of the balls and axial movement toward the drive plate of the balls. The pressure plate seats are configured so as to urge the balls axially against the drive plate to rotationally engage the clutch disk to rotate the driven member as the centrifugal force developed by the balls on the rotating pressure plate urges the balls radially outwardly.

25 Claims, 2 Drawing Sheets

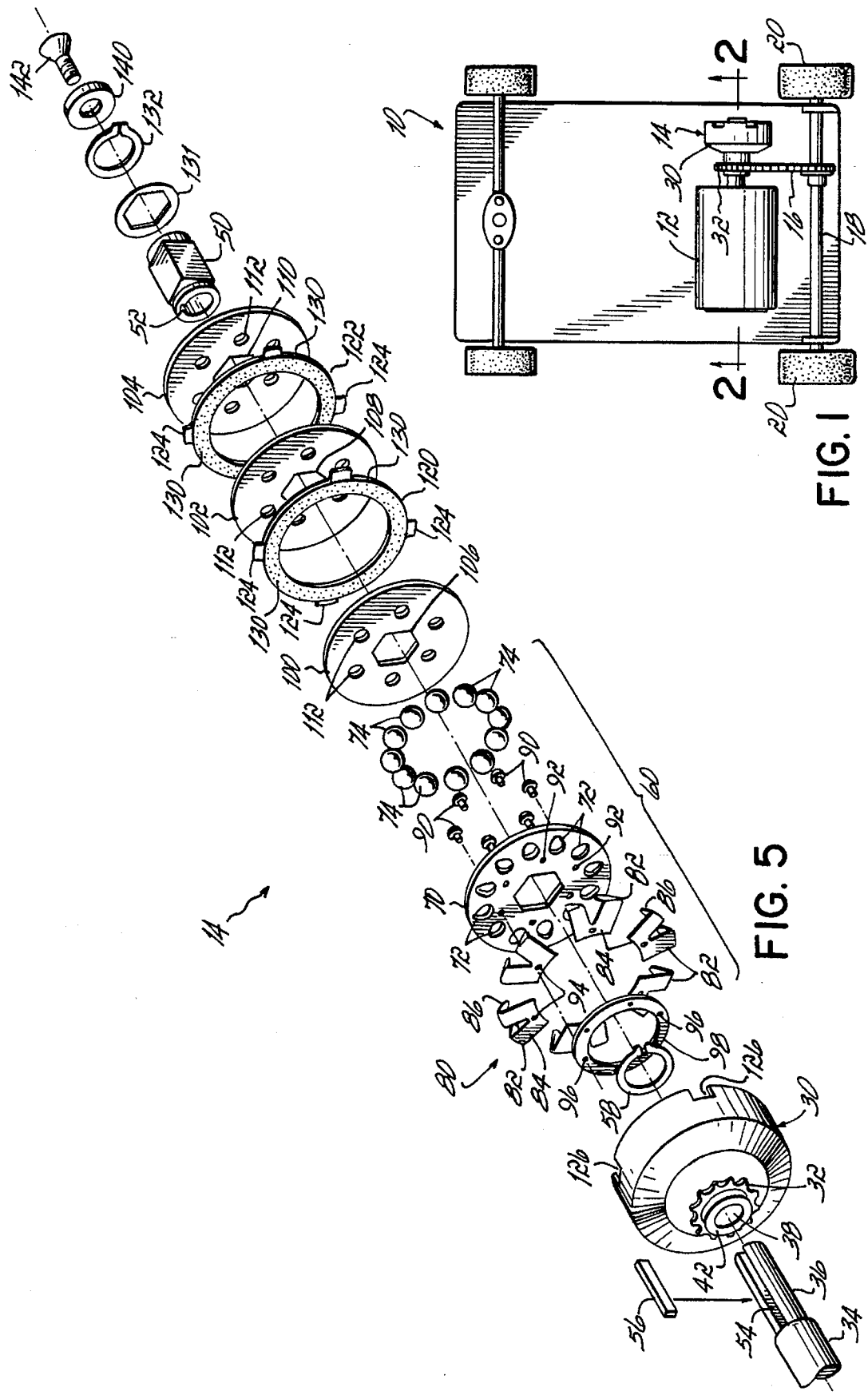

CENTRIFUGAL CLUTCH

FIELD OF THE INVENTION

This invention relates generally to clutches, and more particularly to centrifugal clutches.

BACKGROUND OF THE INVENTION

Centrifugal clutches are well known in the art. In essence, these devices, sometimes known as frictional contact axial clutches, utilize mating frictional members to transfer torque from an input housing to an output shaft. This is accomplished by harnessing the effects of centrifugal force upon radially translatable elements to generate axial movement and ultimately axial thrust. This axial thrust is applied upon an input housing frictional member which, by interacting with an output shaft frictional member, effectively transmits the input housing torque to the output, or driven shaft.

In one such type of axial clutch, the radially translatable elements are simple weights which surround the output shaft. Typically these weights are radially spring biased away from the input housing and against the output shaft. During operation, as the angular velocity of the input housing increases, likewise the centrifugal force developed by each of these weights increases. When the centrifugal force associated with each weight exceeds the preload force developed in each of the weight springs, these weights begin to move radially outwardly. These weights are commonly designed with a slanted surface such that continued outward radial movement of the weights will result in corresponding axial movement of a pressure plate which has a coacting slanted surface abutting the slanted surface of the weights. As the weights translate radially outwardly, the pressure plate continues translating axially compressing a series of clutch rings which are fixedly attached within the input housing. These clutch rings have disposed therebetween the peripheral edges of clutch disks, the disks themselves being splined to the output, or driven shaft. When the axial force applied by the pressure plate develops a sufficiently large frictional force between the clutch rings and the clutch disks so as to preclude slippage therebetween, the clutch becomes engaged and the output shaft commences rotation. The input housing angular velocity at which this engagement occurs is often referred to as the "engagement speed." One such clutch which provides for effecting fine tuning adjustments to account for the change in engagement speed due to frictional war of the clutch rings and disks to maintain a constant engagement speed, and for selectively adjusting the clutch engagement speed, is shown in the inventor's own U.S. Pat. No. 5,070,984.

In another such type of clutch, known as a "ball clutch," weighted balls are substituted for the weights. The balls ride in grooves in the pressure plate which are ramped such that radial movement of the balls causes axial movement of the balls along the ramped grooves. The balls are retained in the grooves by a clutch plate which is spring biased against the balls by one or more axially oriented compression springs. Outward radial movement of the balls upon acceleration causes axial movement of the balls which in turn causes axial movement of the clutch plate against the stiffness of the spring. A clutch disk positioned between the clutch plates is gripped by the clutch plates and thereby has torque transmitted to it and consequently to the output.

One problem associated with such ball clutches is frictional induced hysteresis. Friction between the balls and the ramped grooves and the clutch plate causes the clutch to engage at one speed yet disengage at another speed. This is because the balls travel radially outwardly upon acceleration more readily than they travel radially inwardly upon deceleration due to the frictional forces developed between the mating surfaces. Thus the clutch will engage at a higher speed, but will disengage at a lower speed. The cause of such hysteresis is due at least in part to the relatively inefficient action of the spring force resisting the balls; the direction of the spring force is axial whereas the direction of ball movement is radial and axial, resulting in required spring stiffnesses of on the order of 500 lb/in for this traditional type of ball clutch for each of six springs.

Another drawback to such traditional ball clutches is that they are generally expensive to manufacture. This is because the geometry of the ramped pressure plate generally requires that it be milled rather than fabricated as a cheaper stamping.

It is therefore one objective of the present invention to provide a ball clutch which is more efficient and which exhibits less hysteresis than traditional ball clutches.

It is another objective of the present invention to provide a ball clutch which is less expensive to manufacture than traditional ball clutches which include milled pressure plates.

It is yet another objective of the present invention to provide an axial clutch with the foregoing features the engagement speed of which is easily selected and controlled.

It is still another objective of the present invention to provide an axial clutch with the foregoing features for which the replacement of the consumable parts of the clutch, i.e. clutch drive plates and disks, is simply and quickly accomplished.

SUMMARY OF THE INVENTION

The present invention attains the stated objectives by providing a centrifugal clutch of improved construction. The centrifugal clutch comprises a rotating input drive member, a rotatable output driven member, at least one drive plate mounted for rotation with the drive member, at least one clutch disc mounted for rotation with the driven member and being disposed adjacent the at least one drive plate, a pressure plate mounted for rotation with the drive member and including at least one pair of seats, at least one pair of weighted balls disposed in the pair of seats in the pressure plate, and at least one pair of springs attached to the pressure plate. Each spring of the pair of springs contacts and retains one ball of the pair of balls seated in a respective pressure plate seat. The springs resist outward radial movement of the balls and axial movement toward the drive plate of the balls. The pressure plate seats are configured so as to urge the balls axially against the drive plate to rotationally engage the at least one clutch disk to rotate the driven member as the centrifugal force developed by the balls on the rotating pressure plate urges the balls radially outwardly.

The pressure plate seats are egg-shaped through holes in the pressure plate each having a larger radius and a smaller radius, with the smaller radius end being oriented radially outwardly of the larger radius end. The pressure plate is preferably fabricated as a stamping.

Each spring is a leaf spring having first and second legs. The first leg is attached to the pressure plate on the side opposite to the drive plate. The second leg projects around the peripheral edge of the pressure plate and extends radially inwardly and axially toward the drive plates. The second leg of the spring forms an angle of approximately 90 degrees with a line passing through the center of the ball to thereby maximize the efficiency of the spring. The spring stiffness of the spring is about 100 lb/in when utilizing twelve springs.

The drive member is preferably an input drive shaft and the driven member is preferably an output driven drum housing with an output sprocket attached thereto.

The pressure plate and drive plate are axially retained on the drive member with a pair of retainer clips, the pressure plate and drive plate being positioned between the pair of retainer clips. The engagement speed of the clutch is adjustable by interposing one or more shims between the pressure plate or the drive plate and a respective one of the pair of retainer clips. The drive plate and clutch disk are removable, once worn, for replacement by simply removing the retainer clip associated with the drive plate, removing the worn drive plate and clutch disk from the drive member, installing a new drive plate and clutch disk on the drive member, and replacing the retainer clip.

One advantage of the present invention is that a ball clutch is provided which is more efficient and which exhibits less hysteresis than traditional ball clutches.

Another advantage of the present invention is that a ball clutch is provided which is less expensive to manufacture than traditional ball clutches which include milled pressure plates.

Yet another advantage of the present invention is that an axial clutch is provided with the foregoing features the engagement speed of which is easily selected and controlled.

Still another advantage of the present invention is that an axial clutch with the foregoing features is provided for which the replacement of the consumable parts of the clutch, i.e. clutch drive plates and disks, is simply and quickly accomplished.

These and other objects and advantages of the present invention will become more readily apparent during the following detailed description taken in conjunction with the drawings herein, in which:

BRIEF DESCRIPTION OF THE DRAWINGS

FIG. 1 is a bottom plan view of a vehicle including a centrifugal clutch according to the principles of the present invention;

FIG. 5 is an exploded perspective of the clutch of FIGS. 2-4.

DETAILED DESCRIPTION OF THE INVENTION

Figure 3:
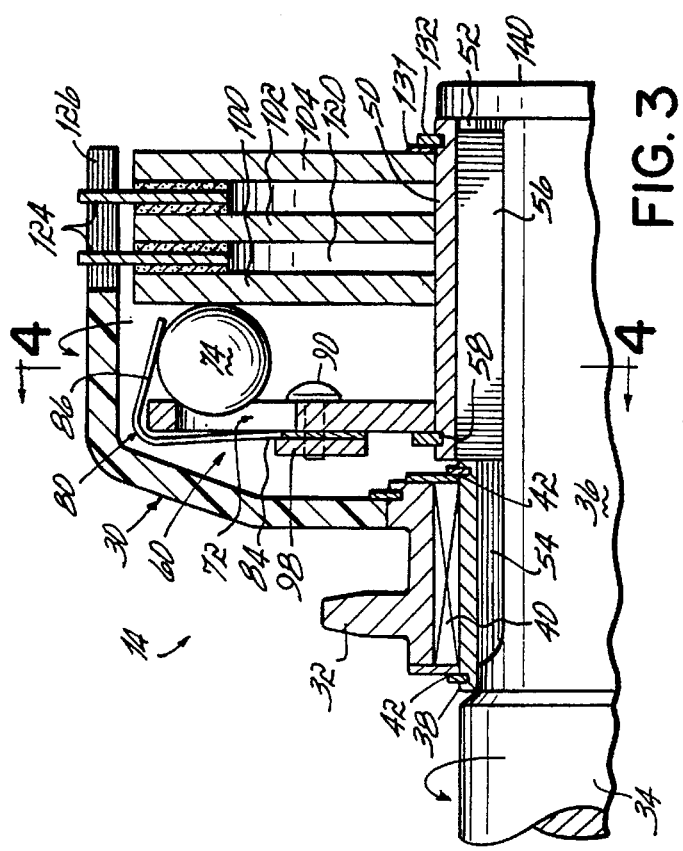
FIG. 3 is a view similar to FIG. 2 illustrating the clutch engaged.

Referring first to FIG. 1, there is shown, from the bottom, a vehicle 10, for example a go-cart, including a motor 12 connected to a clutch 14 of the present invention for transmitting rotation via a chain 16 to a drive shaft 18 for driving wheels 20.

Referring now to FIGS. 2-5, the clutch 14 of the present invention is shown in more detail. More particularly, clutch 14 comprises a drum or housing 30 to which is attached an output sprocket 32 for accepting the chain 16 (FIG. 1). A drive shaft 34 includes a necked down portion 36 which extends through the clutch 14. A hub 38 fits over portion 36 of the drive shaft 34 and has disposed between it and the housing 30 a bearing 40 retained by suitable retaining structure 42. A hex shaft 50 including a keyway 52 fits over portion 36 of the drive shaft 34 which includes a similar mating keyway 54 therein. A key 56 keys the two parts 36, 50 together.

Figure 4:
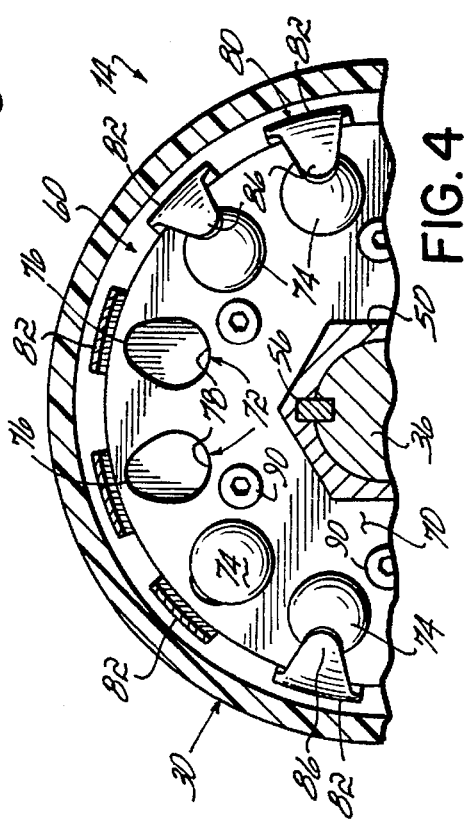
FIG. 4 is a cross-sectional view taken along line 4—4 of FIG. 3.
Figure 2:
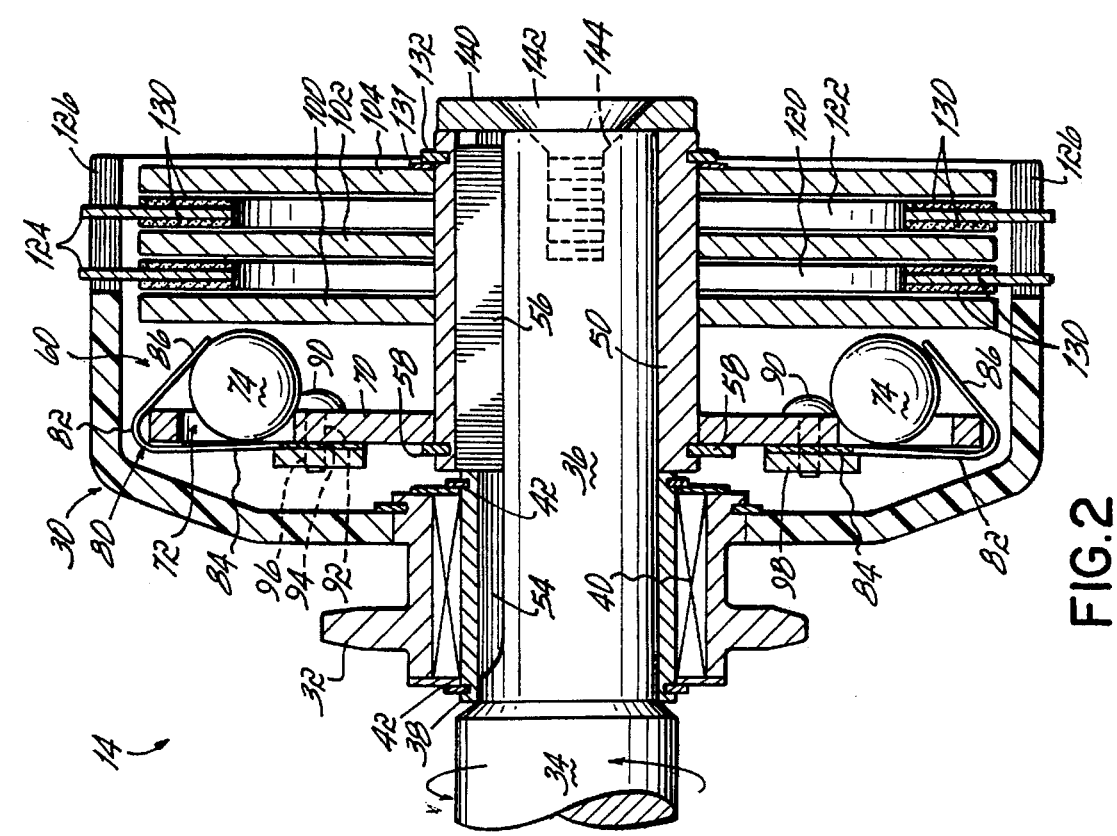
FIG. 2 is a cross-sectional view taken on along line 2—2 of the clutch of FIG. 1 illustrated disengaged.

A retainer clip 58 is located on one end of the hex shaft 50 and axially retains a pressure plate assembly 60 thereon. Pressure plate assembly 60 includes a pressure plate 70 including a plurality of through holes 72 which form seats for a plurality of weighted balls 74. Through holes 72 are generally egg-shaped including a smaller radius end 76 and a larger radius end 78, as best shown in FIG. 4. A plurality of leaf spring assemblies 80 each include two separate leaf springs 82 each of which includes a first leg 84 and a second leg 86. Threaded studs 90 pass through clearance holes 92 in pressure plate 70 and through clearance holes 94 in the spring assemblies 80 and are secured in tapped holes 96 in a nut plate 98.

Three drive plates 100, 102 and 104 are keyed to hex shaft 50 by way of hex through holes 106, 108 and 110, respectively, and include bores 112 for reducing the weight of the plates 100, 102, 104. Disposed intermediate the three drive plates are two clutch disks 120, 122. The clutch disks 120, 122 include radial tabs 124 which cooperate with notches 126 in drum housing 30 rendering the clutch disks 120, 122 rotationally fixed relative to the housing 30. The upper and lower surfaces of the disks 120, 122 include suitable frictional lining 130. One or more shims 131 are positioned over hex shaft 50 against the upper 104 drive plate and are retained in place via retainer clip 132. Hex shaft 50 is retained on portion 36 of the drive shaft 34 via washer 140 and screw 142 which is threadably inserted into tapped hole 144 in the end of the portion 36 of the drive shaft 34.

As best seen in FIG. 4, the egg-shaped through holes 72 in pressure plate 70 function as seats for the weighted balls 74. Due to the egg shape of the holes 72, the holes 72 urge the balls 74 axially towards the drive plate 100 as the centrifugal force developed by the balls 74 on the rotating pressure plate 70 urges the balls 74 radially outwardly. In the preferred embodiment, the egg-shaped holes 72 cause balls 74 to ramp "upwardly" (axially) at an angle of 31 degrees as the balls move radially outwardly. Other angles may be selected or nonlinear curves may be selected. The pressure plate 70 may be inexpensively made as a simple stamping. Further, the shape of the "egg" can be varied to vary the torque vs. rpm curve of the clutch assembly 14.

Referring now again to FIGS. 2 and 3, it will be remembered that each spring 82, a leaf spring, has first and second legs 84 and 86 respectively. The first leg 84 is attached to the bottom of the pressure plate 70, i.e. on the side opposite to the drive plate 100, via the threaded studs 90 and nut plate 96. The second leg 86 projects around the peripheral edge of the pressure plate 70 and extends radially inwardly and axially toward the drive plate 100. In the static condition the leg 86 is approximately normal to the 31 degree ramp formed by egg-shaped hole 72. As is seen from the Figures, the second leg 86 of the spring 82 forms an angle of approximately 90 degrees with a line passing through the center of a respective ball 74 maximizing the efficiency of the spring. Stated another way, the force applied by the ball on the cantilever spring 86 as the pressure plate 70 rotates and the ball 74 tends to move radially outwardly and axially toward the drive plate 100 is approximately perpendicular to the spring cantilever 86. Thus maximizing the efficiency of the cantilever spring 86, the spring stiffness of the spring is only required to be on the order of about 100 lbs. per inch when using twelve springs for a total stiffness of about 100 lbs. per inch, as opposed to prior art ball clutch axial springs which are on the order of about 500 lbs. per inch when using six springs for a total of about 3000 lbs. per inch.

As discussed above, the spring clips 58 and 132 retain the pressure plate assembly 60, drive plates 100, 102, 104 and clutch disks 120, 122 axially on hex shaft 50. The engagement speed of the clutch 14 may readily be adjusted by adding or subtracting additional shims 131. Adding additional shims 131 reduces the axial play in the mechanism thereby lowering the engagement speed, i.e. the speed at which the clutch engages. Similarly, when the drive plates 100, 102 and 104 and clutch disks 120, 122 become worn, they are readily removed for replacement by simply removing the retainer clip 132 and sliding the plates and disks off of the hex shaft 50 and replacing them with new ones. Shims 131 may alternatively be placed between clip 58 and pressure plate 70.

In operation, motor 12 accelerates which likewise accelerates the pressure plate assembly 60 and drive plates 100, 102 and 104 which are rotationally fixed thereto. As centrifugal force develops, the weighted balls 74 begin to move radially outwardly in their egg-shaped seats 72 against the action of the springs 82. Due to the egg-shaped nature of the holes 72, and the fact that the smaller end 76 is located radially outboard of the larger end 78, the balls tend to ramp up out of the holes or seats 72 and towards the drive plate 100. Continued acceleration of the motor and hence pressure plate assembly 60 causes the balls 70 to continue moving radially outwardly and at the same time axially toward the pressure plate 100, at which time balls 74 contact the plate 100. Continued axial movement of the balls 72 exerts axial thrust on the drive plates 100, 102, 104 which compresses each clutch ring 120, 122 therebetween. When the frictional force generated between the clutch rings 120, 122 and the drive plates 100, 102, 104 becomes sufficiently large so as to preclude slippage therebetween, the clutch disks 120, 122 themselves begin to rotate, and at the same time, transmit rotational energy via the tabs 124 and notches 126 to the housing 30, thus rotating output sprocket 32.

Upon decrease in acceleration, the spring force developed in the springs 82 overcomes the centrifugal force generated by the balls 70 to return the balls 70 to their seats 72. Due to the springs 82 acting directly on the weights and the ball force acting perpendicularly to the cantilever spring 86, the clutch 14 disengages at approximately the same speed at which it engages, the pressure plate assembly 60 thereby minimizing the hysteresis effects of prior ball clutches.

Those skilled in the art will readily recognize numerous adaptations and modifications which can be made of the present invention which will result in an improved centrifugal clutch, yet all of which will fall within the spirit and scope of the present invention as defined by the following claims. For example, while shown as being used on go-cart vehicles, the clutch of the present invention has other applications, such as on lawn mowers and the like. Further, the drum housing could be the rotating input drive member and the shaft could be the rotatable output driven member, in which case the pressure plate and drive plates would be mounted for rotation with the housing and the clutch disks would be mounted for rotation with the shaft. Accordingly, the invention is to be limited only by the scope of the following claims and their equivalents.

What is claimed is:

1. A centrifugal clutch comprising:
   a rotating input drive member;
   a rotatable output driven member;
   at least one drive plate mounted for rotation with said drive member;
   at least one clutch disc mounted for rotation with said driven member and being disposed adjacent said drive plate;
   a pressure plate mounted for rotation with said drive member and including at least one pair of seats;
   at least one pair of weighted balls disposed in said pair of seats in said pressure plate; and
   at least one pair of springs attached to said pressure plate, each spring of said pair of springs contacting and retaining one ball of said pair of balls seated in a respective pressure plate seat, said springs resisting outward radial movement of said balls and axial movement toward said drive plate of said balls;
   said pressure plate seats being configured so as to urge said balls axially against said at least one drive plate to rotationally engage said at least one clutch disk to rotate said driven member as the centrifugal force developed by said balls on said rotating pressure plate urges said balls radially outwardly.

2. The clutch of claim 1 wherein:
   said seats are egg-shaped through holes in said pressure plate each having a larger radius and a smaller radius, said smaller radius being oriented radially outwardly of said larger radius.

3. The clutch of claim 2 wherein said pressure plate is a stamping.

4. The clutch of claim 2 wherein:
   each said spring is a leaf spring, said leaf spring having first and second legs;
   said first leg attached to said pressure plate on the side opposite to said drive plate, said second leg projecting around a peripheral edge of said pressure plate and extending radially inwardly and axially toward said drive plate.

5. The clutch of claim 4 wherein:
   said second leg of said spring forms an angle of approximately 90 degrees with a line passing through the center of said ball to thereby maximize the efficiency of said spring.

6. The clutch of claim 5 wherein:
   the spring stiffness of said spring is about 100 lb/in, and there are twelve said springs.

7. The clutch of claim 6 wherein said drive member is an input drive shaft and said driven member is an output driven drum housing with an output sprocket attached thereto.

8. The clutch of claim 1 wherein:
   said pressure plate and drive plate are axially retained on said drive member with a pair of retainer clips, said pressure plate and drive plate positioned between said pair of retainer clips; and
   one or more shims interposed between one of said pressure plate and drive plate and a respective one of said pair of retainer clips to adjustably select the engagement speed of said clutch.

9. The clutch of claim 8 wherein:
   said one or more shims are disposed between said drive plate and a respective one of said pair of retainer clips, whereby said drive plate and clutch disk are removable, once worn, for replacement by removing said respective one of said pair of retainer clips, removing said worn drive plate and clutch disk from said drive member, installing a new drive plate and clutch disk on said drive member, and replacing said one retainer clip.

10. A centrifugal clutch comprising:
    a rotating input drive member;

a rotatable output driven member;

at least drive plate mounted for rotation with said drive member;

at least one clutch disc mounted for rotation with said driven member and being disposed adjacent said drive plate;

a pressure plate mounted for rotation with said drive member;

at least one pair of weighted balls disposed on said pressure plate;

said pressure plate being configured to direct said balls axially toward said drive plates as said balls move radially outwardly; and at least one pair of cantilever leaf springs attached to said pressure plate, each spring of said pair of springs contacting and retaining one ball of said pair of balls seated in a respective pressure plate seat, said springs resisting outward radial movement of said balls and axial movement toward said drive plate of said balls, the line of action of said ball with said cantilever spring forming an angle of about 90 degrees to thereby maximize the efficiency of said cantilever spring;

said pressure plate urging said balls axially against said at least one drive plate to rotationally engage said at least one clutch disk to rotate said driven member as the centrifugal force developed by said balls on said rotating pressure plate urges said balls radially outwardly.

11. The clutch of claim 10 wherein:

said pressure plate includes at least one pair of seats which are egg-shaped through holes in said pressure plate each having a larger radius and a smaller radius, said smaller radius being oriented radially outwardly of said larger radius.

12. The clutch of claim 11 wherein said pressure plate is a stamping.

13. The clutch of claim 11 wherein:

each said leaf spring has first and second legs;

said first leg attached to said pressure plate on the side opposite to said drive plate, said second leg projecting around a peripheral edge of said pressure plate and extending radially inwardly and axially toward said drive plates.

14. The clutch of claim 13 wherein:

the spring stiffness of said spring is about 100 lb/in.

15. The clutch of claim 14 wherein said drive member is an input drive shaft and said driven member is an output driven drum housing with an output sprocket attached thereto.

16. The clutch of claim 10 wherein:

said pressure plate and drive plate are axially retained on said drive member with a pair of retainer clips, said pressure plate and drive plate positioned between said pair of retainer clips; and one or more shims interposed between one of said pressure plate and drive plate and a respective one of said pair of retainer clips to adjustably select the engagement speed of said clutch.

17. The clutch of claim 16 wherein:

said one or more shims are disposed between said drive plate and a respective one of said pair of retainer clips, whereby said drive plate and clutch disk are removable, once worn, for replacement by removing said respective one of said pair of retainer clips, removing said worn drive plate and clutch disk from said drive member, installing a new drive plate and clutch disk on said drive member, and replacing said one retainer clip.

18. A centrifugal clutch comprising:

a rotating input drive member;

a rotatable output driven member;

at least one drive plate mounted for rotation with said drive member;

at least one clutch disc mounted for rotation with said driven member and being disposed adjacent said drive plate;

a pressure plate mounted for rotation with said drive member and including at least one pair of seats, said seats being egg-shaped through holes in said pressure plate each having a larger radius and a smaller radius, said smaller radius being oriented radially outwardly of said larger radius;

at least one pair of weighted balls disposed in said pair of seats in said pressure plate; and at least one pair of springs attached to said pressure plate, each spring of said pair of springs contacting and retaining one ball of said pair of balls seated in a respective pressure plate seat and resisting outward radial movement of said ball and axial movement toward said drive plate of said ball;

said pressure plate seats urging said balls axially against said at least one drive plate to rotationally engage said at least one clutch disk to rotate said driven member as the centrifugal force developed by said balls on said rotating pressure plate urges said balls radially outwardly.

19. The clutch of claim 18 wherein said pressure plate is a stamping.

20. The clutch of claim 18 wherein:

each said spring is a leaf spring, said leaf spring having first and second legs;

said first leg attached to said pressure plate on the side opposite to said drive plate, said second leg projecting around a peripheral edge of said pressure plate and extending radially inwardly and axially toward said drive plates.

21. The clutch of claim 20 wherein:

said second leg of said spring forms an angle of approximately 90 degrees with the center of said ball to thereby maximize the efficiency of said spring.

22. The clutch of claim 21 wherein:

the spring stiffness of said spring is about 100 lb/in.

23. The clutch of claim 20 wherein said drive member is an input drive shaft and said driven member is an output driven drum housing with an output sprocket attached thereto.

24. The clutch of claim 18 wherein:

said pressure plate and drive plate are axially retained on said drive member with a pair of retainer clips, said pressure plate and drive plate positioned between said retainer clips; and one or more shims interposed between one of said pressure plate and drive plate and a respective one of said pair of retainer clips to adjustably select the engagement speed of said clutch.

25. The clutch of claim 22 wherein:

said one or more shims are disposed between said drive plate and a respective one of said pair of retainer clips, whereby said drive plate and clutch disk are removable, once worn, for replacement by removing said respective one of said pair of retainer clips, removing said worn drive plate and clutch disk from said drive member, installing a new drive plate and clutch disk on said drive member, and replacing said one retainer clip.

* * * * *

UNITED STATES PATENT AND TRADEMARK OFFICE
CERTIFICATE OF CORRECTION

PATENT NO.   : 5,638,935
DATED        : June 17, 1997
INVENTOR(S)  : Thomas C. Fehring It is certified that error appears in the above-indentified patent and that said Letters Patent is hereby corrected as shown below:

Column 7, line 2, should read -- at least one drive plate -- not "at least drive plate".

Signed and Sealed this

Twenty-eighth Day of October, 1997

Attest:

BRUCE LEHMAN

Attesting Officer

Commissioner of Patents and Trademarks